(12) United States Patent
Nohara et al.

(10) Patent No.: US 11,865,813 B2
(45) Date of Patent: Jan. 9, 2024

(54) INTERMEDIATE FILM FOR LAMINATED GLASS, AND LAMINATED GLASS

(71) Applicant: SEKISUI CHEMICAL CO., LTD., Osaka (JP)

(72) Inventors: Atsushi Nohara, Kouka (JP); Masaki Yamamoto, Kouka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 215 days.

(21) Appl. No.: 16/978,742

(22) PCT Filed: Mar. 29, 2019

(86) PCT No.: PCT/JP2019/013950
§ 371 (c)(1),
(2) Date: Sep. 7, 2020

(87) PCT Pub. No.: WO2019/189740
PCT Pub. Date: Oct. 3, 2019

(65) Prior Publication Data
US 2021/0046739 A1    Feb. 18, 2021

(30) Foreign Application Priority Data
Mar. 29, 2018  (JP) .................................. 2018-065770

(51) Int. Cl.
*B32B 17/10* (2006.01)
*B32B 27/08* (2006.01)
(Continued)

(52) U.S. Cl.
CPC .. *B32B 17/10678* (2013.01); *B32B 17/10036* (2013.01); *B32B 17/10339* (2013.01);
(Continued)

(58) Field of Classification Search
None
See application file for complete search history.

(56) References Cited

U.S. PATENT DOCUMENTS

2008/0199670 A1* 8/2008 Yaoita ................. C03C 17/3435
428/213
2008/0206533 A1   8/2008 Yaoita et al.
(Continued)

FOREIGN PATENT DOCUMENTS

CN   103328404 A   9/2013
CN   104066580 A   9/2014
(Continued)

OTHER PUBLICATIONS

Nakai—JP H07-74737 A—ISR D6—MT—laminated glass—1992 (Year: 1992).*
(Continued)

*Primary Examiner* — John Vincent Lawler
(74) *Attorney, Agent, or Firm* — Cheng Law Group, PLLC

(57) ABSTRACT

Provided is an interlayer film for laminated glass capable of suppressing the discoloration by the light and heat in an interlayer film including a resin layer colored with a coloring agent. The interlayer film for laminated glass according to the present invention has an infrared reflective layer, and a first resin layer containing a thermoplastic resin, the first resin layer is arranged on a first surface side of the infrared reflective layer, the infrared reflective layer has a first maximum reflection wavelength at a wavelength of 350 nm to 450 nm, and a second maximum reflection wavelength at a wavelength of 800 nm or more, each of reflectance at the first maximum reflection wavelength and reflectance at the second maximum reflection wavelength is 15% or more, and the first resin layer contains a coloring agent.

8 Claims, 2 Drawing Sheets

(51) Int. Cl.
  *C03C 27/06* (2006.01)
  *C08J 5/18* (2006.01)
  *G02B 5/20* (2006.01)

(52) U.S. Cl.
  CPC .. *B32B 17/10651* (2013.01); *B32B 17/10688* (2013.01); *B32B 17/10761* (2013.01); *B32B 27/08* (2013.01); *C03C 27/06* (2013.01); *C08J 5/18* (2013.01); *G02B 5/208* (2013.01); *B32B 2307/304* (2013.01); *B32B 2307/4026* (2013.01); *B32B 2307/416* (2013.01); *B32B 2329/00* (2013.01); *B32B 2419/00* (2013.01); *B32B 2605/006* (2013.01)

(56) References Cited

U.S. PATENT DOCUMENTS

| | | | |
|---|---|---|---|
| 2013/0302580 | A1 | 11/2013 | Tomida et al. |
| 2014/0327958 | A1 | 11/2014 | Yoshimura et al. |
| 2015/0168619 | A1* | 6/2015 | Ohmoto ............ B32B 17/10761 359/359 |
| 2016/0082697 | A1* | 3/2016 | Hara ................. C08J 7/044 428/212 |
| 2016/0152007 | A1 | 6/2016 | Tsunoda et al. |
| 2016/0154153 | A1* | 6/2016 | Tsunoda ............ G02B 5/208 359/360 |
| 2016/0271910 | A1* | 9/2016 | Saito ............ B32B 17/10036 |
| 2016/0332424 | A1* | 11/2016 | Yamaguchi ....... B32B 17/10201 |
| 2016/0332425 | A1 | 11/2016 | Yamaguchi et al. |
| 2017/0259533 | A1* | 9/2017 | Yamamoto ........ B32B 17/10036 |
| 2018/0081097 | A1 | 3/2018 | Konuma et al. |
| 2020/0031099 | A1 | 1/2020 | Tsunoda et al. |
| 2021/0197531 | A1 | 7/2021 | Yamaguchi et al. |

FOREIGN PATENT DOCUMENTS

| | | | | |
|---|---|---|---|---|
| CN | 105324689 | A | 2/2016 | |
| CN | 105873877 | A | 8/2016 | |
| EP | 2 666 757 | A1 | 11/2013 | |
| EP | 2 998 769 | A1 | 3/2016 | |
| EP | 3 009 411 | A1 | 4/2016 | |
| JP | 4-74737 | A | 3/1992 | |
| JP | H04-74737 | * | 3/1992 | ............ C03C 27/12 |
| JP | 2008-037667 | * | 2/2008 | ............ B32B 17/10 |
| JP | 2008-37667 | A | 2/2008 | |
| JP | 2010-248026 | A | 11/2010 | |
| JP | 2012-254915 | * | 12/2012 | ............ B32B 17/06 |
| JP | 2012-254915 | A | 12/2012 | |
| JP | 2017-81775 | A | 5/2017 | |
| JP | 2018-002534 | * | 1/2018 | ............ B32B 15/08 |
| JP | 2018-2534 | A | 1/2018 | |
| WO | WO-2007/020791 | A1 | 2/2007 | |
| WO | WO-2012/157385 | A1 | 11/2012 | |
| WO | WO-2014/185518 | A1 | 11/2014 | |
| WO | WO-2014/200108 | A1 | 12/2014 | |
| WO | WO-2015/147218 | A1 | 10/2015 | |

OTHER PUBLICATIONS

Kimura—JP 2008-037667 A—ISR D5—MT—laminated glass—2008 (Year: 2008).*
Noguchi—JP 2012-254915 A—ISR D4—MT—laminate for windows—2012 (Year: 2012).*
Nishikawa—JP 2018-002534 A—ISR D2—MT—laminated glass—Jan. 2018 (Year: 2018).*
Merriam-Webster—Polyvinyl acetal Definition & Meaning—May 31, 2022 (Year: 2022).*
Supplementary European Search Report for the Application No. 19 775 182.9 dated Nov. 29, 2021.
Written Opinion of the International Searching Authority (PCT/ISA/237) for Application No. PCT/JP2019/013950 dated Jul. 2, 2019 (English Translation dated Oct. 8, 2020).
The First Office Action for the Application No. 201980023090.7 from The State Intellectual Property Office of the People's Repubiic of China dated Apr. 22, 2022.
International Search Report for the Application No. PCT/JP2019/013950 dated Jul. 2, 2019.
Written Opinion of the International Searching Authority (PCT/ISA/237) for Application No. PCT/JP2019/013950 dated Jul. 2, 2019.
"Guidance for Plastic Product Designers", Editors-in-chief: Tang Zhiyu and Xu Peixian, 1st edition, Defense Industry Press, Sep. 1993, pp. 467-468.
Chinese Decision of Refusal for the Application No. 201980023090.7 from The State Intellectual Property Office of the People's Republic of China dated Dec. 1, 2022.
Taiwanese Office Action for the Application No. 108111420 dated Jan. 7, 2023.

* cited by examiner

[FIG. 1]
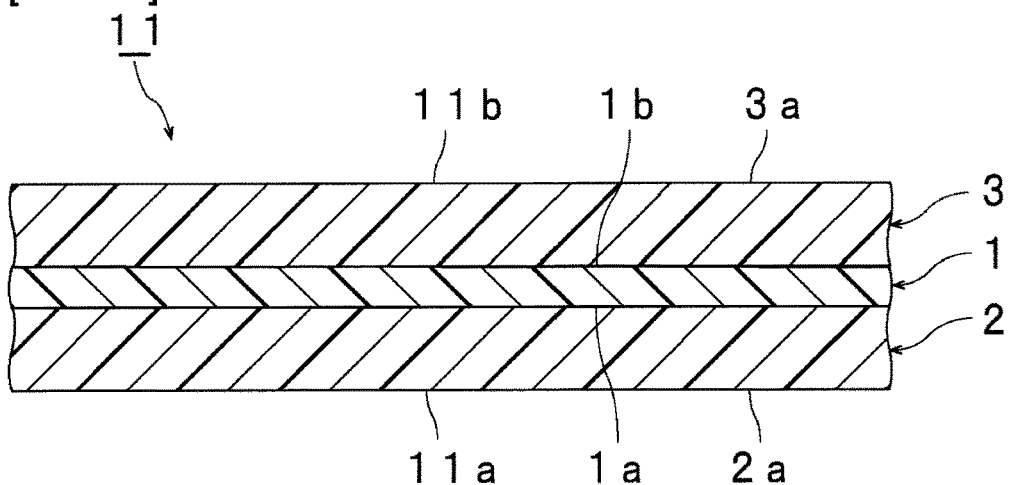
[FIG. 2]
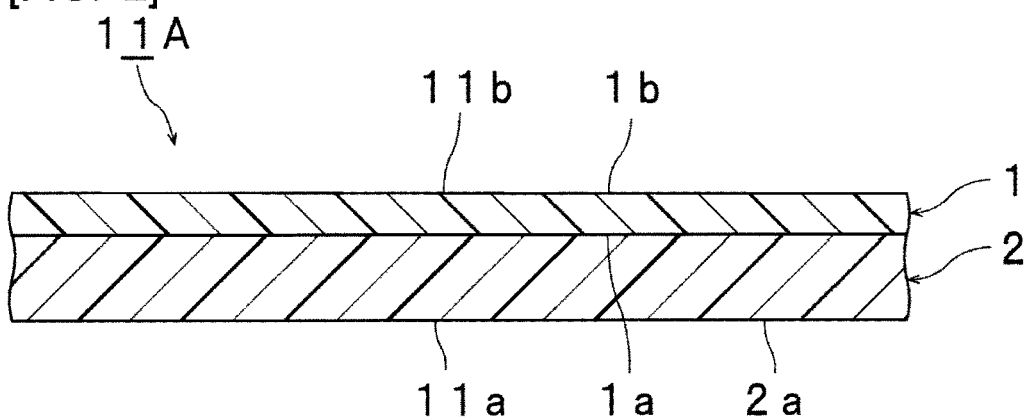
[FIG. 3]
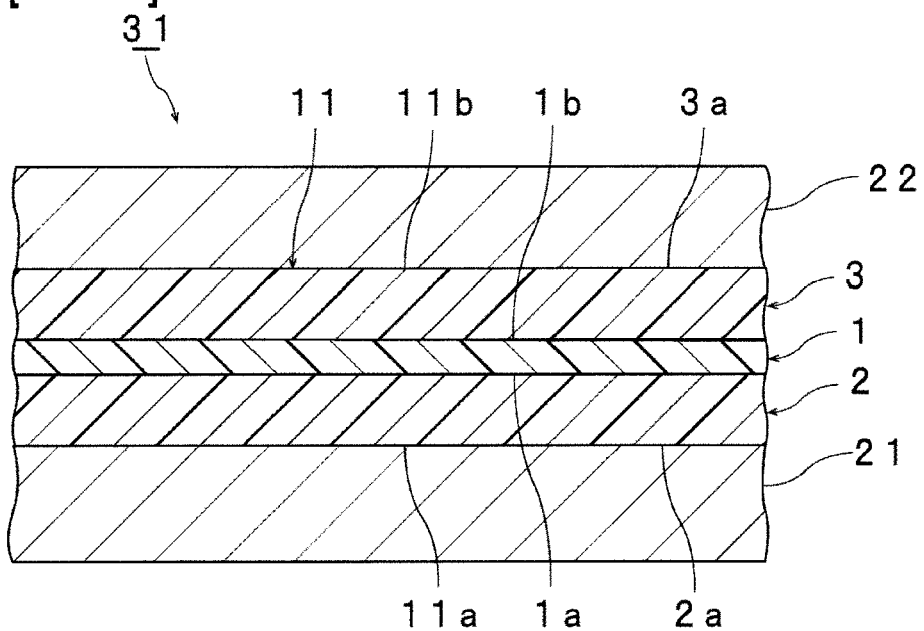

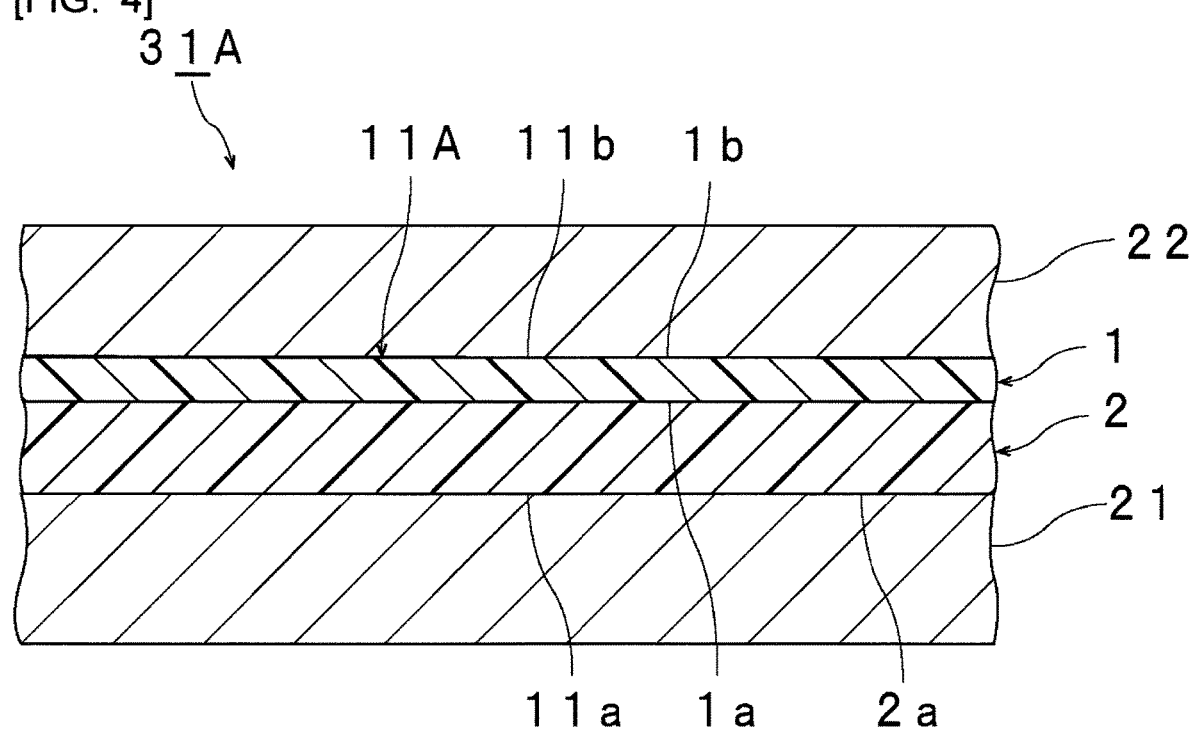

INTERMEDIATE FILM FOR LAMINATED GLASS, AND LAMINATED GLASS

TECHNICAL FIELD

The present invention relates to an interlayer film for laminated glass, having an infrared reflective layer. Moreover, the present invention relates to a laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. High heat shielding property is required for such a laminated glass used in openings of vehicles and buildings.

For enhancing the heat shielding property, an interlayer film having an infrared reflective layer is sometimes used. The interlayer film having an infrared reflective layer is disclosed in the following Patent Document 1.

In a laminated glass, design quality and design property are sometimes requested. Not only colorless and transparent laminated glass, but also colored laminated glass are known. A colored interlayer film to be used for obtaining a colored laminated glass is disclosed in the following Patent Document 2. The interlayer film contains a coloring agent.

RELATED ART DOCUMENTS

Patent Documents

Patent Document 1: JP 2017-81775 A
Patent Document 2: JP 2010-248026 A

SUMMARY OF THE INVENTION

Problems to be Solved by the Invention

For example, a laminated glass prepared with an interlayer film is attached to an opening of a vehicle. Sunlight enters the laminated glass attached to the opening of the vehicle, and the laminated glass is exposed to high temperature.

A laminated glass prepared with a conventional colored interlayer film sometimes discolors by the light and heat. As a result, the design quality and design property of the laminated glass can be impaired.

It is an object of the present invention to provide an interlayer film for laminated glass capable of suppressing the discoloration by the light and heat in an interlayer film including a resin layer colored with a coloring agent. Moreover, the present invention is also aimed at providing laminated glass prepared with the interlayer film for laminated glass.

Means for Solving the Problems

According to a broad aspect of the present invention, there is provided an interlayer film for laminated glass (hereinafter, sometimes described as interlayer film) comprising an infrared reflective layer, and a first resin layer containing a thermoplastic resin, the first resin layer being arranged on a first surface side of the infrared reflective layer, the infrared reflective layer having a first maximum reflection wavelength at a wavelength of 350 nm to 450 nm, and a second maximum reflection wavelength at a wavelength of 800 nm or more, each of reflectance at the first maximum reflection wavelength and reflectance at the second maximum reflection wavelength being 15% or more, the first resin layer containing a coloring agent.

In a specific aspect of the interlayer film according to the present invention, the infrared reflective layer contains a metal sputtered layer.

In a specific aspect of the interlayer film according to the present invention, the coloring agent is a perylene compound, a phthalocyanine compound, a naphthalocyanine compound, or an anthracyanine compound.

In a specific aspect of the interlayer film according to the present invention, the first resin layer contains heat shielding particles.

It is preferred that the thermoplastic resin in the first resin layer be a polyvinyl acetal resin.

It is preferred that the first resin layer contain a plasticizer.

In a specific aspect of the interlayer film according to the present invention, the interlayer film includes a second resin layer, and the second resin layer is arranged on a second surface side opposite to the first surface of the infrared reflective layer.

It is preferred that the thermoplastic resin in the second resin layer be a polyvinyl acetal resin.

It is preferred that the second resin layer contain a plasticizer.

According to a broad aspect of the present invention, there is provided a laminated glass comprising a first lamination glass member, a second lamination glass member, and the aforementioned interlayer film for laminated glass, the interlayer film having or being free of a second resin layer, the second resin layer being arranged on a second surface side opposite to the first surface of the infrared reflective layer when the interlayer film has the second resin layer, the first lamination glass member being arranged outside the first resin layer and the second lamination glass member being arranged outside the second resin layer when the interlayer film has the second resin layer, the first lamination glass member being arranged outside the first resin layer and the second lamination glass member being arranged outside the infrared reflective layer when the interlayer film is free of the second resin layer.

In a specific aspect of the laminated glass according to the present invention, the laminated glass is a laminated glass that is attached to an opening between an exterior space, and an interior space to which a heat ray is incident from the exterior space, in a building or vehicle, in such a manner that the second lamination glass member is situated on a side of the exterior space, and the first lamination glass member is situated on a side of the interior space.

Effect of the Invention

The interlayer film for laminated glass according to the present invention includes an infrared reflective layer, and a first resin layer containing a thermoplastic resin. In the interlayer film for laminated glass according to the present invention, the first resin layer is arranged on a first surface side of the infrared reflective layer. In the interlayer film for laminated glass according to the present invention, the infrared reflective layer has a first maximum reflection wavelength at a wavelength of 350 nm to 450 nm, and a second maximum reflection wavelength at a wavelength of 800 nm or more, and each of a reflectance at the first maximum reflection wavelength and a reflectance at the second maximum reflection wavelength is 15% or more. In the interlayer film for laminated glass according to the present invention, the first resin layer contains a coloring agent. Since the interlayer film for laminated glass according to the present invention is provided with the above configuration, it is possible to suppress the discoloration by the light and heat in the interlayer film including a resin layer colored with a coloring agent.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODES FOR CARRYING OUT THE INVENTION

Hereinafter, the present invention will be described in detail.

(Interlayer Film for Laminated Glass)

The interlayer film for laminated glass according to the present invention (hereinafter, sometimes described as interlayer film) has an infrared reflective layer, and a first resin layer containing a thermoplastic resin. In the interlayer film according to the present invention, the first resin layer is arranged on a first surface side of the infrared reflective layer. In the interlayer film according to the present invention, the infrared reflective layer has a first maximum reflection wavelength at a wavelength of 350 nm to 450 nm, and a second maximum reflection wavelength at a wavelength of 800 nm or more, and each of a reflectance at the first maximum reflection wavelength and a reflectance at the second maximum reflection wavelength is 15% or more. In the interlayer film according to the present invention, the first resin layer contains a coloring agent.

Since the interlayer film according to the present invention is provided with the above configuration, it is possible to suppress the discoloration by the light and heat in the interlayer film including a resin layer colored with a coloring agent. A laminated glass prepared with the interlayer film according to the present invention can be attached to an opening between an exterior space, and an interior space to which a heat ray is incident from the exterior space, for example, in a building or vehicle, in such a manner that the first resin layer is situated on a side of the interior space. In this case, the heat rays such as sunlight are sufficiently reflected by the infrared reflective layer before they reach the first resin layer. The heat rays such as sunlight generally include rays of light having a wavelength of 350 nm to 450 nm and rays of light having a wavelength of 800 nm or more. In the present invention, since the reflectance is enhanced both at the first maximum reflection wavelength at a wavelength of 350 nm to 450 nm, and at the second maximum reflection wavelength at a wavelength of 800 nm or more, it is possible to suppress the discoloration by the light and additionally suppress the discoloration by the heat.

The interlayer film may have a local maximum absorption wavelength at a wavelength of less than 350 nm that is different from the first and second maximum absorption wavelengths. The interlayer film may have a local maximum absorption wavelength at a wavelength of 350 nm to 450 nm that is different from the first maximum absorption wavelength, and the reflectance of the local maximum absorption wavelength may be less than 15%. The interlayer film may have a local maximum absorption wavelength at a wavelength of more than 450 nm and less than 800 nm that is different from the first and second maximum absorption wavelengths. The interlayer film may have a local maximum absorption wavelength at a wavelength of 800 nm or more that is different from the second maximum absorption wavelength, and the reflectance of the local maximum absorption wavelength may be less than 15%.

The maximum absorption wavelength of the infrared reflective layer is measured in the following manner.

Reflectance is measured by using a spectrophotometer ("U-4100" available from Hitachi High-Tech Corporation) in conformity with JIS R3106:1998, and the wavelength at which the obtained spectrum shows the maximum value is defined as the maximum absorption wavelength.

The first resin layer contains a coloring agent. Therefore, the visible light transmittance of the interlayer film may be low. From the viewpoint of further enhancing the visibility through the laminated glass, the visible light transmittance of the interlayer film is preferably 20% or more, more preferably 50% or more, further preferably 70% or more. From the viewpoint of further enhancing the design quality and design property of the laminated glass, the visible light transmittance of the interlayer film is preferably 88% or less, more preferably 87% or less, further preferably 86% or less.

The visible light transmittance is measured at a wavelength ranging from 380 nm to 780 nm by using a spectrophotometer ("U-4100" available from Hitachi High-Tech Corporation) in conformity with JIS R3211:1998.

The interlayer film has a second resin layer or does not have a second resin layer. From the viewpoint of further enhancing the adhesivity between the lamination glass member and the interlayer film, the interlayer film may have a second resin layer. When the interlayer film has the second resin layer, the second resin layer is arranged on a second surface side opposite to the first surface of the infrared reflective layer.

The interlayer film may be wound into a roll shape to form a roll body of the interlayer film. The roll body may be provided with a winding core and the interlayer film. The interlayer film may be wound around an outer periphery of the winding core.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a three or more-layer structure. The interlayer film 11 is used for obtaining laminated glass. The interlayer film 11 is an interlayer film for laminated glass. The interlayer film 11 includes an infrared reflective layer 1, a first resin layer 2, and a second resin layer 3. The first resin layer 2 is arranged on a first surface 1a side of the infrared reflective layer 1 to be layered thereon. The second resin layer 3 is arranged on a second surface 1b side opposite to the first surface 1a of the infrared reflective layer 1 to be layered thereon. The infrared reflective layer 1 is an intermediate layer. Each of the first resin layer 2 and the second resin layer 3 is a protective layer and is a surface layer in the present embodiment. The infrared reflective layer 1 is arranged between the first resin layer 2 and the second resin layer 3 to be sandwiched therebetween. Accordingly, the interlayer film 11 has a multilayer structure (first resin layer 2/infrared reflective layer 1/second resin layer 3) in which the first resin layer 2, the infrared reflective layer 1, and the second resin layer 3 are layered in this order.

FIG. 2 is a sectional view schematically showing an interlayer film for laminated glass in accordance with a second embodiment of the present invention.

An interlayer film 11A shown in FIG. 2 is a multi-layered interlayer film having a two-layer structure. The interlayer film 11A is used for obtaining laminated glass. The interlayer film 11A is an interlayer film for laminated glass. The interlayer film 11A includes the infrared reflective layer 1, and the first resin layer 2. The first resin layer 2 is arranged on a first surface 1a side of the infrared reflective layer 1 to be layered thereon. The interlayer film 11A has a multilayer structure (first resin layer 2/infrared reflective layer 1) in which the first resin layer 2 and the infrared reflective layer 1 are layered in this order.

In this connection, other layers may be arranged between the first resin layer 2 and the infrared reflective layer 1 and between the infrared reflective layer 1 and the second resin layer 3. It is preferred that the first resin layer 2 and the infrared reflective layer 1, and the infrared reflective layer 1 and the second resin layer 3 be directly layered. Examples of other layers include an adhesive layer, and a layer containing polyethylene terephthalate and the like.

Hereinafter, other details of members constituting the interlayer film and the laminated glass according to the present invention are described.

(Infrared Reflective Layer)

The infrared reflective layer reflects infrared rays. The infrared reflective layer has a first maximum reflection wavelength at a wavelength of 350 nm to 450 nm, and a second maximum reflection wavelength at a wavelength of 800 nm or more. Each of a reflectance at the first maximum reflection wavelength and a reflectance at the second maximum reflection wavelength is 15% or more. An infrared reflective layer having such properties is selectively used.

From the viewpoint of effectively suppressing the discoloration by the light and heat, it is preferred that the infrared reflective layer include a metal sputtered layer. The metal sputtered layer can be formed by metal sputtering. The infrared reflective layer including the metal sputtered layer may be a resin film with metal foil.

Examples of the infrared reflective layer include a resin film with metal foil, a multilayer laminate film in which a metal layer and a dielectric layer are formed on a resin layer, a film containing graphite, a multilayer resin film, and a liquid crystal film. These films have the property of reflecting infrared rays.

It is preferred that the infrared reflective layer be a resin film with metal foil, a film containing graphite, a multilayer resin film, or a liquid crystal film. These films are significantly excellent in the infrared reflecting property. Therefore, by using these films, it is possible to obtain a laminated glass having still higher heat shielding property, and capable of keeping the high visible light transmittance for a still longer term.

The resin film with metal foil includes a resin film, and a metal foil layered on the outer surface of the resin film. Examples of the material of the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material of the metal foil include aluminum, copper, silver, gold, palladium, and alloys containing these metals.

The multilayer laminate film in which a metal layer and a dielectric layer are formed on a resin layer is a multilayer laminate film in which any number of layers of the metal layer and the dielectric layer are alternately layered. In the multilayer laminate film in which a metal layer and a dielectric layer are formed on a resin layer, it is preferred that all of the metal layers and the dielectric layers be layered alternately, however, there may be a structural part in which a metal layer and a dielectric layer are not layered alternately as exemplified by metal layer/dielectric layer/metal layer/dielectric layer/metal layer/metal layer/dielectric layer/metal layer.

As the material of the resin layer (resin film) in the multilayer laminate film, those exemplified as the material of the resin film in the resin film with metal foil can be exemplified. Examples of the material of the resin layer (resin film) in the multilayer laminate film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamide such as nylon 6, 11, 12, 66 and the like, polystyrene, polycarbonate, polyethylene terephthalate, polyethylene naphthalate, polyester, polyphenylene sulfide, and polyether imide. As the material of the metal layer in the multilayer laminate film, those exemplified as the material of the metal foil in the resin film with metal foil can be exemplified. A coating layer of metal or a mixed oxide of metal can be given to the both faces or either face of the metal layer. Examples of the material of the coating layer include ZnO, $Al_2O_3$, $Ga_2O_3$, $InO_3$, MgO, Ti, NiCr and Cu.

Examples of the dielectric layer in the multilayer laminate film include indium oxide.

The multilayer resin film is a laminate film in which a plurality of resin films are layered. As the material of the multilayer resin film, those exemplified as the material of the resin layer (resin film) in the multilayer laminate film can be exemplified. The number of layered resin films in the multilayer resin film is 2 or more, and may be 3 or more, and may be 5 or more. The number of layered resin films in the multilayer resin film may be 1000 or less, and may be 100 or less, and may be 50 or less.

The multilayer resin film may be a multilayer resin film in which any number of layers of two or more kinds of thermoplastic resin films having different optical properties (refractive index) are layered alternately or randomly. Such a multilayer resin film is so configured that a desired infrared reflecting property is obtained.

As the liquid crystal film, a film in which any number of layers of cholesteric liquid crystal layers that reflect the light of any wavelength are layered can be recited. Such a liquid crystal film is so configured that desired infrared reflecting property is obtained.

For excellent performance of reflecting infrared rays, it is preferred that the infrared reflective layer have such a property that the infrared transmittance is 40% or less at at least one wavelength within the range of 800 nm to 2000 nm. The infrared transmittance of the infrared reflective layer used in the later-described example satisfies the aforementioned preferred requirement. At at least one wavelength within the range of 800 nm to 2000 nm, the infrared transmittance is more preferably 30% or less, and further preferably 20% or less.

Transmittance at each wavelength within the wavelength range of 800 nm to 2000 nm of the infrared reflective layer is specifically measured in the following manner. A single infrared reflective layer is prepared. Spectral transmittance at each wavelength within the wavelength of 800 nm to 2000 nm of the infrared reflective layer is obtained by using a spectrophotometer ("U-4100" available from Hitachi High-Tech Science Corporation) in conformity with JIS R3106: 1998 or JIS R3107:2013. It is preferred that spectral transmittance at each wavelength within the wavelength of 800 nm to 2000 nm of the infrared reflective layer be obtained in conformity with JIS R3107:2013.

(First Resin Layer and Second Resin Layer)

Thermoplastic Resin:

The first resin layer contains a thermoplastic resin (hereinafter, sometimes described as a thermoplastic resin (1)). It is preferred that the first resin layer contain a polyvinyl acetal resin (hereinafter, sometimes described as a polyvinyl acetal resin (1)) as the thermoplastic resin (1). The second resin layer contains a thermoplastic resin (hereinafter, sometimes described as a thermoplastic resin (2)), and it is preferred that the second resin layer contain a polyvinyl acetal resin (hereinafter, sometimes described as a polyvinyl acetal resin (2)) as the thermoplastic resin (2).

The thermoplastic resin (1) and the thermoplastic resin (2) may be the same as or different from each other. One kind of each of the thermoplastic resin (1) and the thermoplastic resin (2) may be used alone, and two or more kinds thereof may be used in combination. One kind of each of the polyvinyl acetal resin (1) and the polyvinyl acetal resin (2) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl acetate resin, a polystyrene resin, and an ionomer resin. Thermoplastic resins other than these may be used.

It is preferred that the thermoplastic resin be a polyvinyl acetal resin. By using a polyvinyl acetal resin and a plasticizer together, the adhesive force of the resin layer to other layer such as a lamination glass member or an infrared reflective layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of a resin layer is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the resin layer is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

A content of the hydroxyl group (the amount of hydroxyl groups) of the polyvinyl acetal resin is preferably 15% by mole or more, more preferably 18% by mole or more, further preferably 20% by mole or more, and especially preferably 28% by mole or more, and is preferably 40% by mole or less, more preferably 35% by mole or less, and further preferably 32% by mole or less. When the content of the hydroxyl group is the above lower limit or more, the adhesive force of the resin layer further increases. Moreover, when the content of the hydroxyl group is the above upper limit or less, the flexibility of the resin layer is enhanced and the handling of the resin layer is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree (the amount of acetyl groups) of the polyvinyl acetal resin is preferably 0.1% by mole or more, more preferably 0.3% by mole or more, further preferably 0.5% by mole or more and is preferably 30% by mole or less, more preferably 25% by mole or less, further preferably 20% by mole or less, especially preferably 15% by mole or less, most preferably 3% by more or less. When the acetylation degree is the above lower limit or more, the compatibility between the polyvinyl acetal resin and a plasticizer is enhanced. When the acetylation degree is the above upper limit or less, the moisture resistance of the laminated glass is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (the butyralization degree in the case of a polyvinyl butyral resin) is preferably 60% by mole or more, more preferably 63% by mole or more, and preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Plasticizer:

From the viewpoint of further enhancing the adhesive force of the resin layer, it is preferred that the first resin layer contain a plasticizer. From the viewpoint of further enhancing the adhesive force of the resin layer, it is preferred that the second resin layer contain a plasticizer. It is especially preferred that a resin layer contain a plasticizer when the thermoplastic resin contained in the resin layer is a polyvinyl acetal resin. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

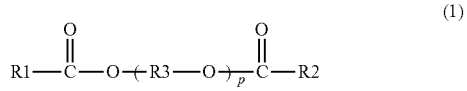

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer is not particularly limited. In the layer containing a plasticizer (the first resin layer, or the second resin layer), the content of the plasticizer is preferably 25 parts by weight or more, more preferably 30 parts by weight or more, and further preferably 35 parts by weight or more per 100 parts by weight of the thermoplastic resin. In the layer containing a plasticizer (the first resin layer, or the second resin layer), the content of the plasticizer is preferably 75 parts by weight or less, more preferably 60 parts by weight or less, further preferably 50 parts by weight or less, and especially preferably 40 parts by weight or less per 100 parts by weight of the thermoplastic resin. When the content of the plasticizer is the above lower limit or more, the penetration resistance of laminated glass is further enhanced. When the content of the plasticizer is the above upper limit or less, the transparency of laminated glass is further enhanced.

Coloring Agent:

The first resin layer contains a coloring agent. The second resin layer may contain a coloring agent. The content of the coloring agent in the second resin layer may be smaller than the content of the coloring agent in the first resin layer. When the first resin layer has a shade region containing a coloring agent, it is preferred that the first resin layer contain a coloring agent in a region excluding the shade region. One kind of the coloring agent may be used alone and two or more kinds thereof may be used in combination.

Examples of the coloring agent include a pigment, a dye and the like.

The pigment and the dye are discriminated from each other in the following manner.

A polyvinyl butyral resin (using n-butyl aldehyde, the polymerization degree of polyvinyl alcohol of 1700, the content of the hydroxyl group of 30% by mole, the acetylation degree of 1% by mole, the butyralization degree of 69% by mole) is prepared. One hundred parts by weight of the polyvinyl butyral resin, 40 parts by weight of triethylene glycol di-2-ethylhexanoate (3GO), and a coloring agent in an amount of 0.015 parts by weight per 100% by weight of the total amount of the polyvinyl butyral resin, 3GO and the coloring agent are kneaded to obtain a kneaded material. The kneaded product is extruded to obtain a resin film having a thickness of 760 μm. The resin film is arranged between two sheets of clear glass (2.5 mm in thickness) having a visible light transmittance of 90% measured in conformity with JIS R3106:1998 to prepare a laminated glass. The coloring agent that gives a laminated glass having a haze value of 0.35% or more is defined as a pigment. The coloring agent that gives a haze value of less than 0.35% is defined as a dye.

The pigment may be an organic pigment or may be an inorganic pigment. The organic pigment may be an organic pigment having a metal atom, or may be an organic pigment free of a metal atom. One kind of the pigment may be used alone, and two or more kinds thereof may be used in combination.

Examples of the organic pigment include a phthalocyanine compound, a quinacridone compound, an azo compound, a pentaphene compound, a dioxazine compound, a perylene compound, an indole compound and a dioxazine compound.

Examples of the inorganic pigment include carbon black, and iron oxide, zinc oxide and titanium oxide.

It is preferred that the coloring agent be a phthalocyanine compound, a naphthalocyanine compound, an anthracyanine compound, a quinacridone compound, an azo compound, a pentaphene compound, a dioxazine compound, a perylene compound, an indole compound or carbon black.

From the viewpoint of effectively enhancing the design quality and design property, and effectively suppressing the discoloration by the light and heat, it is preferred that the coloring agent be at least one Ingredient X-1 selected from a perylene compound, a phthalocyanine compound, a naphthalocyanine compound and an anthracyanine compound. From the viewpoint of enhancing the design quality and design property more effectively, and suppressing the discoloration by the light and heat more effectively, it is more preferred that the coloring agent be at least one Ingredient X selected from a phthalocyanine compound, a naphthalocyanine compound and an anthracyanine compound.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property, it is preferred that the Ingredient X be phthalocyanine, a derivative of phthalocyanine, naphthalocyanine or a derivative of naphthalocyanine, and it is more preferred that the Ingredient X be phthalocyanine or a derivative of phthalocyanine.

From the viewpoints of effectively enhancing the heat shielding properties and maintaining the visible light transmittance at a higher level over a long period of time, it is preferred that the Ingredient X contain vanadium atom or copper atom. It is preferred that the Ingredient X contain vanadium atom and it is also preferred that the Ingredient X contain copper atom. It is more preferred that the Ingredient X be at least one kind among phthalocyanine containing vanadium atom or copper atom and a derivative of phthalocyanine containing vanadium atom or copper atom. From the viewpoint of still further suppressing multiple images, and still further enhancing the heat shielding property in the laminated glass, it is preferred that the Ingredient X have a structural unit in which an oxygen atom is bonded to a vanadium atom.

From the viewpoint of further enhancing the design quality and design property, it is preferred that the content of the coloring agent and the content of the Ingredient X-1 and the Ingredient X satisfy the following preferred ranges.

In 100% by weight of the layer containing a coloring agent (the first resin layer or the second resin layer), the content of the coloring agent is preferably 0.001% by weight or more, more preferably 0.002% by weight or more, further preferably 0.003% by weight or more, especially preferably 0.004% by weight or more, most preferably 0.005% by weight or more. In 100% by weight of the layer containing a coloring agent (the first resin layer or the second resin layer), the content of the coloring agent is preferably 10% by weight or less, more preferably 9% by weight or less, further preferably 8% by weight or less, especially preferably 7% by weight or less. When the content of the coloring agent is the above lower limit or more, the design quality and design property are further enhanced. When the content of the coloring agent is the above upper limit or less, the visibility through the laminated glass is further enhanced.

In 100% by weight of the region of the layer containing a coloring agent (the first resin layer or the second resin layer) excluding the shade region, the content of the coloring agent is preferably 0.001% by weight or more, more preferably 0.002% by weight or more, further preferably 0.003% by weight or more, especially preferably 0.004% by weight or more, most preferably 0.005% by weight or more. In 100% by weight of the region of the layer containing a coloring agent (the first resin layer or the second resin layer) excluding the shade region, the content of the coloring agent is preferably 10% by weight or less, more preferably 9% by weight or less, further preferably 8% by weight or less, especially preferably 7% by weight or less. When the content of the coloring agent is the above lower limit or more, the design quality and design property are further enhanced. When the content of the coloring agent is the above upper limit or less, the visibility through the laminated glass is further enhanced.

In 100% by weight of the layer containing the Ingredient X-1 and the Ingredient X (the first resin layer or the second resin layer), each of the contents of the Ingredient X-1 and the Ingredient X is preferably 0.001% by weight or more, more preferably 0.002% by weight or more, further preferably 0.003% by weight or more, especially preferably 0.004% by weight or more, most preferably 0.005% by weight or more. In 100% by weight of the layer containing the Ingredient X-1 and the Ingredient X (the first resin layer or the second resin layer), the content of the Ingredient X-1 and the Ingredient X is preferably 10% by weight or less, more preferably 9% by weight or less, further preferably 8% by weight or less, especially preferably 7% by weight or less. When the content of the Ingredient X-1 and the Ingredient X is the above lower limit or more, the design quality and design property are further enhanced. When the content of the coloring agent is the above upper limit or less, the visibility through the laminated glass is further enhanced.

In 100% by weight of the region excluding the shade region of the layer containing the Ingredient X-1 and the Ingredient X (the first resin layer or the second resin layer), the content of the Ingredient X-1 and the Ingredient X is preferably 0.001% by weight or more, more preferably 0.002% by weight or more, further preferably 0.003% by weight or more. In 100% by weight of the region excluding the shade region of the layer containing the Ingredient X-1 and the Ingredient X (the first resin layer or the second resin layer), the content of the Ingredient X-1 and the Ingredient X is especially preferably 0.004% by weight or more, most preferably 0.005% by weight or more. In 100% by weight of the region excluding the shade region of the layer containing the Ingredient X-1 and the Ingredient X (the first resin layer or the second resin layer), the content of the Ingredient X-1 and the Ingredient X is preferably 10% by weight or less, more preferably 9% by weight or less, further preferably 8% by weight or less, especially preferably 7% by weight or less. When the content of the Ingredient X-1 and the Ingredient X is the above lower limit or more, the design quality and design property are further enhanced. When the content of the coloring agent is the above upper limit or less, the visibility through the laminated glass is further enhanced.

Heat Shielding Substance:

It is preferred that the first resin layer contain a heat shielding substance. The content of the heat shielding substance in the second resin layer may be smaller than the content of the heat shielding substance in the first resin layer. It is preferred that the second resin layer contain a heat shielding substance. The second resin layer need not contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

It is preferred that the first resin layer contain at least one kind of Ingredient X among a phthalocyanine compound, a naphthalocyanine compound, and an anthracyanine compound. The content of the Ingredient X in the second resin layer may be smaller than the content of the Ingredient X in the first resin layer. It is preferred that the second resin layer contain the Ingredient X. The second resin layer need not contain the Ingredient X. One kind of the Ingredient X may be used alone, and two or more kinds thereof may be used in combination.

The Ingredient X corresponds also to the heat shielding substance. From the viewpoint of effectively enhancing the heat shielding property, it is preferred that the first resin layer contain the Ingredient X. The content of the Ingredient X in the second resin layer may be smaller than the content of the Ingredient X in the first resin layer. From the viewpoint of effectively enhancing the heat shielding property, it is preferred that the second resin layer contain the Ingredient X. The second resin layer need not contain the Ingredient X. One kind of the Ingredient X may be used alone, and two or more kinds thereof may be used in combination.

From the viewpoint of effectively enhancing the heat shielding property, it is preferred that the content of the Ingredient X satisfy the following preferred range.

In 100% by weight of the layer containing Ingredient X (the first resin layer or the second resin layer), the content of the Ingredient X is preferably 0.001% by weight or more, more preferably 0.005% by weight or more, further preferably 0.01% by weight or more, especially preferably 0.02% by weight or more. In 100% by weight of the layer containing Ingredient X (the first resin layer or the second resin layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

It is preferred that the first resin layer contain the heat shielding particles. The content of the heat shielding particles in the second resin layer may be smaller than the content of the heat shielding particles in the first resin layer. It is preferred that the second resin layer contain the heat shielding particles. The second resin layer need not contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

From the viewpoint of further enhancing the heat shielding property of the laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding property of the laminated glass, cesium-doped tungsten oxide particles are especially preferred. From the viewpoint of further enhancing the heat shielding property of the laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the layer containing the heat shielding particles (the first resin layer or the second resin layer), the content of the heat shielding particles is preferably 0.01% by weight or more, more preferably 0.1% by weight or more, further preferably 1% by weight or more, especially preferably 1.5% by weight or more. In 100% by weight of the layer containing the heat shielding particles (the first resin layer or the second resin layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

Metal Salt:

It is preferred that the first resin layer contain an alkali metal salt, an alkaline earth metal salt or a metal salt which is a magnesium salt (hereinafter, these are sometimes described as Metal salt M). It is preferred that the second resin layer contain the Metal salt M. By the use of the Metal salt M, it becomes easy to control the adhesivity between the resin layer, and the infrared reflective layer and a lamination glass member. One kind of the Metal salt M may be used alone, and two or more kinds thereof may be used in combination.

It is preferred that the Metal salt M contain metal which is Li, Na, K, Rb, Cs, Mg, Ca, Sr or Ba. It is preferred that the metal salt included in the resin layer contain K or Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the layer containing the Metal salt M (the first resin layer or the second resin layer) is preferably 5 ppm or more, more preferably 10 ppm or more, further preferably 20 ppm or more, preferably 300 ppm or less, more preferably 250 ppm or less and further preferably 200 ppm or less. When the total of the contents of Mg and K is the above lower limit or more and the above upper limit or less, the adhesivity between the resin layer, and the infrared reflective layer and a lamination glass member can be controlled more satisfactorily.

Ultraviolet Ray Screening Agent:

It is preferred that the first resin layer contain an ultraviolet ray screening agent. It is preferred that the second resin layer contain an ultraviolet ray screening agent. By the use of an ultraviolet ray screening agent, even when the laminated glass is used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the layer containing the ultraviolet ray screening agent (the first resin layer or the second resin layer), the content of the ultraviolet ray screening agent is preferably 0.1% by weight or more, more preferably 0.2% by weight or more, further preferably 0.3% by weight or more, especially preferably 0.5% by weight or more. In 100% by weight of a layer containing the ultraviolet ray screening agent (the first resin layer or the second resin layer), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period is further suppressed. In particular, by setting the content of the ultraviolet ray screening agent to be 0.2% by weight or more in 100% by weight of a layer containing the ultraviolet ray screening agent, the lowering in visible light transmittance of the laminated glass after the lapse of a certain period of time can be significantly suppressed.

Oxidation Inhibitor:

It is preferred that the first resin layer contain an oxidation inhibitor. It is preferred that the second resin layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

In order to maintain high visible light transmittance of the laminated glass over a long period of time, it is preferred that the content of the oxidation inhibitor be 0.1% by weight or more in 100% by weight of the layer containing the oxidation inhibitor (the first resin layer or the second resin layer). Moreover, it is preferred that the content of the oxidation inhibitor be 2% by weight or less in 100% by weight of the layer containing the oxidation inhibitor.

Other Ingredients:

Each of the first resin layer and the second resin layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The interlayer film may be an interlayer film having a uniform thickness, or may be an interlayer film having varying thickness. The sectional shape of the interlayer film may be a rectangular shape and may be a wedge-like shape.

It is preferred that the interlayer film have protrusions and recesses on the outer surface. In this case, it suffices that the interlayer film has protrusions and recesses on at least one surface of the outer surface of both sides. It is preferred that the interlayer film have protrusions and recesses on at least one surface of the outer surface of both sides. It is more preferred that the interlayer film have protrusions and recesses on the outer surface of both sides. It is preferred that the outer surface of the interlayer film be embossed. In this case, it suffices that at least one surface of the outer surface of both sides is embossed. It is preferred that at least one surface of the outer surface of both sides of the interlayer film be embossed. It is more preferred that the outer surface of both sides of the interlayer film be embossed. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Laminated Glass)

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22 and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is arranged on an outer surface 2a of the first resin layer 2 to be layered thereon. The second lamination glass member 22 is arranged on an outer surface 3a of the second resin layer 3 to be layered thereon.

FIG. 4 is a sectional view schematically showing an example of laminated glass prepared with the interlayer film for laminated glass shown in FIG. 2.

The laminated glass 31A shown in FIG. 4 is provided with a first lamination glass member 21, a second lamination glass member 22 and an interlayer film 11A. The interlayer film 11A is arranged between the first lamination glass member 21 and the second lamination glass member 22 to be sandwiched therebetween.

The first lamination glass member 21 is layered on a first surface 11a of the interlayer film 11A. The second lamination glass member 22 is layered on a second surface 11b opposite to the first surface 11a of the interlayer film 11A. The first lamination glass member 21 is arranged on an outer surface 2a of the first resin layer 2 to be layered thereon. The second lamination glass member 22 is arranged on the second surface 1b (outer surface) of the infrared reflective layer 1 to be layered thereon.

As described above, the laminated glass according to the present invention includes a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member. When the interlayer film has the second resin layer, the first lamination glass member is arranged outside the first resin layer, and the second lamination glass member is arranged outside the second resin layer. When the interlayer film does not have the second resin layer, the first lamination glass member is arranged outside the first resin layer, and the second lamination glass member is arranged outside the infrared reflective layer.

It is preferred that the laminated glass be attached to an opening between an exterior space, and an interior space to which a heat ray is incident from the exterior space in a vehicle, in such a manner that the first lamination glass member is situated on a side of the exterior space, and the second lamination glass member is situated on a side of the interior space.

It is preferred that the first lamination glass member be the first glass plate. It is preferred that the second lamination glass member be the second glass plate.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, more preferably 1.8 mm or more, further preferably 2 mm or more, especially preferably 2.1 mm or more and is preferably 5 mm or less, more preferably 3 mm or less. When the lamination glass member is a glass plate, the thickness of the glass plate is preferably 1 mm or more, more preferably 1.8 mm or more, further preferably 2 mm or more, especially preferably 2.1 mm or more and is preferably 5 mm or less, more preferably 3 mm or less, further preferably 2.6 mm or less. When the lamination glass member is a PET film, the thickness of the PET film is preferably 0.03 mm or more and is preferably 0.5 mm or less.

It is preferred that each of the first lamination glass member and the second lamination glass member be clear glass or heat-ray absorbing plate glass. It is preferred that the second lamination glass member be a clear glass because the clear glass is high in infrared transmittance, and provides the laminated glass with higher heat shielding property. It is preferred that the first lamination glass member be a heat ray absorbing plate glass because the heat ray absorbing plate glass is low in infrared transmittance, and provides the laminated glass with higher heat shielding property. It is preferred that the heat-ray absorbing plate glass be green glass. It is preferred that the second lamination glass member be a clear glass, and the first lamination glass member be a heat ray absorbing plate glass. The heat-ray absorbing plate glass is heat-ray absorbing plate glass conforming to JIS R3208.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained. At the time of manufacturing the laminated glass, the layers may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile. The laminated glass is suitably used for a windshield of a car. It is preferred that the laminated glass be a laminated glass that can be used for a windshield of a car.

Hereinafter, the present invention will be described in more detail with reference to examples and comparative examples. The present invention is not limited only to these examples.

(Thermoplastic Resin)

Polyvinyl acetal resin (PVB, average polymerization degree: 1700, content of hydroxyl group: 30.5% by mole, acetylation degree: 1% by mole, acetalization degree: 68.5% by mole)

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Coloring Agent)

Anthraquinone compound (Ingredient X-1, "Sumiplast Violet RR" available from Sumica Chemtex Co., Ltd.)

Phthalocyanine compound (Ingredient X-1, "NIR-43V" available from YAMADA CHEMICAL CO., LTD,)

Perylene compound (Ingredient X-1, "PV Fast Red B" available from CLARIANT)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.): 0.2 parts by weight (Oxidation Inhibitor)

BHT (2,6-di-t-butyl-p-cresol)

The following infrared reflective layer was prepared.

(Infrared Reflective Layer)

Infrared reflective films 1 to 6 (film in which a silver sputtered layer is formed on a film, own product)

Infrared reflective film 1 was prepared according to the following procedure. As a base, a polyethylene terephthalate (PET) film (50 μm in thickness) was used. On the base, sputtering was performed using niobium was as a target. Sputtering was conducted in the conditions of sputter power: medium frequency (MF) 1500 W, atmospheric gas: argon gas at a gas flow rate of 225 sccm, and oxygen gas at a gas flow rate of 65 sccm, and sputtering pressure of 0.177 Pa, to form a metal oxide layer having a thickness of 30 nm formed of niobium oxide ($Nb_2O_3$).

Next, on the metal oxide layer, sputtering was performed using niobium was as a target. Sputtering was conducted in the conditions of sputter power: medium frequency (MF) 1500 W, atmospheric gas: argon gas at a gas flow rate of 225 sccm, and oxygen gas at a gas flow rate of 30 sccm, and sputtering pressure of 0.170 Pa, to form an oxygen-deficient metal oxide layer having a thickness of 4 nm formed of oxygen-deficient niobium oxide ($Nb_2O_x$, x is less than 3).

Next, on the oxygen-deficient metal oxide layer, sputtering was performed using silver as a target. Sputtering was conducted in the conditions of sputter power: direct current (DC) 1150 W, atmospheric gas: argon gas at a gas flow rate of 225 sccm, and sputtering pressure of 0.28 Pa, to form a silver layer having a thickness of 16 nm formed of silver.

The conditions in sputtering the metal oxide layer, the oxide-deficient metal oxide layer and the silver layer were respectively the same as the aforementioned conditions except that the thickness of each layer to be sputtered was changed. On a base, a conductive layer in which metal oxide layer (30 nm)/oxygen-deficient metal oxide layer (4 nm)/silver layer (16 nm)/oxygen-deficient metal oxide layer (4 nm)/metal oxide layer (80 nm)/oxygen-deficient metal oxide layer (4 nm)/silver layer (16 nm)/oxygen-deficient metal oxide layer (4 nm)/metal oxide layer (30 nm) are layered in this order was formed. In this manner, the infrared reflective film 1 was obtained.

In the infrared reflective films 2 to 6, the thicknesses of the metal oxide layer, the oxygen-deficient metal oxide layer and the silver layer were changed from those in the manufacturing method of the infrared reflective film 1 at the time of sputtering so that the first and second maximum reflection wavelengths shown in the following Tables 1, 2, and the reflectance at the first and second maximum reflection wavelengths shown in Tables 1, 2 were achieved, to obtain the infrared reflective films 2 to 6.

Nano90S (3M, multilayer resin film, "Multilayer Nano 90S" available from Sumitomo 3M Limited)

The following lamination glass members were prepared.

(Lamination Glass Members)

Green glass (heat-ray absorbing plate glass, 2 mm in thickness)

Clear glass (2.5 mm in thickness)

Example 1

Preparation of First Resin Layer:

The following ingredients were mixed, and kneaded sufficiently with a mixing roll to obtain a composition for forming a first resin layer.

Polyvinyl acetal resin (PVB, average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight Anthraquinone compound (Ingredient X-1, "Sumiplast Violet RR" available from Sumica Chemtex Co., Ltd.) in an amount of 0.77% by weight in the obtained resin layer.

Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in the obtained resin layer.

BHT (2,6-di-t-butyl-p-cresol): an amount that is to be 0.2% by weight in the obtained resin layer.

The obtained composition for forming a first resin layer was extruded with an extruder to obtain a first resin layer. The first resin layer was rectangular, and the thickness of the first resin layer was 380 μm.

Preparation of Second Resin Layer:

The following ingredients were mixed, and kneaded sufficiently with a mixing roll to obtain a composition for forming a second resin layer.

Polyvinyl acetal resin (PVB, average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in the obtained resin layer.

BHT (2,6-di-t-butyl-p-cresol): an amount that is to be 0.2% by weight in the obtained resin layer.

The obtained composition for forming a second resin layer was extruded with an extruder to obtain a second resin layer. The second resin layer was rectangular, and the thickness of the second resin layer was 380 μm.

Preparation of infrared reflective layer, first lamination glass member, and second lamination glass member:

As the infrared reflective layer, the infrared reflective film 1 was prepared.

As the first lamination glass member, a green glass (heat ray absorbing plate glass, 2 mm in thickness) was prepared.

As the second lamination glass member, a clear glass (2.5 mm in thickness) was prepared.

Preparation of Laminated Glass:

The first lamination glass member, the first resin layer, the infrared reflective layer, the second resin layer, and the second lamination glass member were layered in this order to obtain a laminated glass. The wedge angle of the first laminate of the first lamination glass member and the first resin layer was the same as the wedge angle of the first resin layer.

Examples 2 to 6 and Comparative Examples 1 to 6

A laminated glass was obtained in the same manner as that in Example 1 except that the configuration of the interlayer film was changed to those shown in the following Tables 1, 2.

In Comparative Examples 1 to 3, an infrared reflective layer was not used. In Examples 2 to 6 and Comparative Examples 1 to 6, the ultraviolet ray screening agent and the oxidation inhibitor as those used in Example 1 were mixed in the same mixing amounts as those in Example 1 in the resin layers, in the first and second resin layers. The coloring agent was mixed in the mixing amount shown in the following Tables 1, 2 per 100% by weight of the obtained resin layer.

(Evaluation)

(1) Light Resistance Test

The obtained laminated glass was retained in a xenon weather meter NX25 (available from Suga Test Instruments Co., Ltd.) for 3000 hours, and then the judgment was conducted according to the following criteria. Lower color difference ΔE is preferred.

[Criteria for Judgment in Light Resistance Test]
○: Color difference ΔE before and after light resistance test is less than 4
x: Color difference ΔE before and after light resistance test is 4 or more (2) Heat Resistance Test The obtained laminated glass was retained in a constant temperature oven at 100° C. for 12 weeks, and judgment was conducted according to the following criteria. Lower color difference ΔE is preferred.

[Criteria for Judgment in Heat Resistance Test]
○: Color difference ΔE before and after heat resistance test is less than 1
x: Color difference ΔE before and after heat resistance test is 1 or more The details and the results are shown in the following Tables 1, 2. In Table, the description of the ultraviolet ray screening agent and the oxidation inhibitor was omitted.

TABLE 1

| | | | | | Example 1 | Example 2 | Example 3 | Example 4 | Example 5 | Example 6 |
|---|---|---|---|---|---|---|---|---|---|---|
| Configuration | First resin layer | Thermoplastic resin | Kind | — | PVB | PVB | PVB | PVB | PVB | PVB |
| | | | Mixing amount | parts by weight | 100 | 100 | 100 | 100 | 100 | 100 |
| | | Plasticizer | Kind | — | 3GO | 3GO | 3GO | 3GO | 3GO | 3GO |
| | | | Mixing amount | parts by weight | 40 | 40 | 40 | 40 | 40 | 40 |
| | | Coloring agent | Kind | — | Anthraquinone compound | Phthalocyanine compound | Perylene compound | Anthraquinone compound | Phthalocyanine compound | Perylene compound |
| | | | Mixing amount | % by weight | 0.77 | 0.73 | 0.34 | 0.34 | 0.15 | 0.67 |
| | Infrared reflective layer | Kind | | — | Infrared reflective film 1 | Infrared reflective film 2 | Infrared reflective film 3 | Infrared reflective film 4 | Infrared reflective film 5 | Infrared reflective film 6 |
| | | First maximum reflection wavelength | | nm | 410 | 410 | 410 | 410 | 410 | 410 |
| | | Reflectance at first maximum reflection wavelength | | % | 29 | 28.8 | 29.5 | 29.1 | 29.2 | 29.4 |
| | | Second maximum reflection wavelength | | nm | 1600 | 1600 | 1600 | 1600 | 1600 | 1600 |
| | | Reflectance at second maximum reflection wavelength | | % | 71.2 | 71.4 | 71.6 | 71.5 | 71.1 | 71.9 |
| | Second resin layer | Thermoplastic resin | Kind | — | PVB | PVB | PVB | PVB | PVB | PVB |
| | | | Mixing amount | parts by weight | 100 | 100 | 100 | 100 | 100 | 100 |
| | | Plasticizer | Kind | — | 3GO | 3GO | 3GO | 3GO | 3GO | 3GO |
| | | | Mixing amount | parts by weight | 40 | 40 | 40 | 40 | 40 | 40 |
| Evaluation | Light resistance test | | ΔE | — | 3.4 | 0.9 | 2.9 | 2.7 | 0.4 | 3.3 |
| | | | Judgement | — | ○ | ○ | ○ | ○ | ○ | ○ |
| | Heat resistance test | | ΔE | — | 0.8 | 0.6 | 0.7 | 0.5 | 0.5 | 0.9 |
| | | | Judgement | — | ○ | ○ | ○ | ○ | ○ | ○ |

TABLE 2

| | | | | | Comparative Example 1 | Comparative Example 2 | Comparative Example 3 | Comparative Example 4 | Comparative Example 5 | Comparative Example 6 |
|---|---|---|---|---|---|---|---|---|---|---|
| Configuration | First resin layer | Thermoplastic resin | Kind | — | PVB | PVB | PVB | PVB | PVB | PVB |
| | | | Mixing amount | parts by weight | 100 | 100 | 100 | 100 | 100 | 100 |
| | | Plasticizer | Kind | — | 3G0 | 3GO | 3GO | 3GO | 3GO | 3GO |
| | | | Mixing amount | parts by weight | 40 | 40 | 40 | 40 | 40 | 40 |
| | | Coloring agent | Kind | — | Anthraquinone compound | Phthalocyanine compound | Perylene compound | Anthraquinone compound | Phthalocyanine compound | Perylene compound |
| | | | Mixing amount | % by weight | 0.77 | 0.73 | 0.34 | 0.77 | 0.73 | 0.34 |

TABLE 2-continued

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| | Infrared reflective layer | Kind | — | — | — | — | Nano90s | Nano90s | Nano90s |
| | | First maximum reflection wavelength | nm | — | — | — | 410 | 410 | 410 |
| | | Reflectance at first maximum reflection wavelength | % | — | — | — | 13.1 | 13.2 | 13 |
| | | Second maximum reflection wavelength | nm | — | — | — | 900 | 900 | 900 |
| | | Reflectance at second maximum reflection wavelength | % | — | — | — | 77 | 77.1 | 69.9 |
| | Second resin layer | Thermoplastic resin | Kind | PVB | PVB | PVB | PVB | PVB | PVB |
| | | | Mixing amount parts by weight | 100 | 100 | 100 | 100 | 100 | 100 |
| | | Plasticizer | Kind | 3GO | 3GO | 3GO | 3GO | 3GO | 3GO |
| | | | Mixing amount parts by weight | 40 | 40 | 40 | 40 | 40 | 40 |
| Evaluation | Light resistance test | ΔE | — | 8.3 | 5.5 | 5.6 | 6.6 | 4.2 | 5.1 |
| | | Judgement | — | x | x | x | x | x | x |
| | Heat resistance test | ΔE | — | 1.7 | 1.2 | 1.9 | 1.3 | 0.9 | 1.7 |
| | | Judgement | — | x | x | x | x | ○ | x |

EXPLANATION OF SYMBOLS

1: Infrared reflective layer
1a: First surface
1b: Second surface
2: First resin layer
2a: Outer surface
3: Second resin layer
3a: Outer surface
11, 11A: Interlayer film
11a: First surface
11b: Second surface
21: First lamination glass member
22: Second lamination glass member
31, 31A: Laminated glass

The invention claimed is:

1. A laminated glass comprising:
a first lamination glass member, a second lamination glass member, and an interlayer film for laminated glass,
the interlayer film for laminated glass comprising an infrared reflective layer, a first resin layer containing a thermoplastic resin, and a second resin layer containing a thermoplastic resin,
the first resin layer being arranged on a first surface side of the infrared reflective layer,
the second resin layer being arranged on a second surface side opposite to the first surface of the infrared reflective layer,
the first lamination glass member being arranged outside the first resin layer,
the second lamination glass member being arranged outside the second resin layer,
the infrared reflective layer having a first maximum reflection wavelength at a wavelength of 350 nm to 450 nm, and a second maximum reflection wavelength at a wavelength of 800 nm or more, each of a reflectance at the first maximum reflection wavelength and a reflectance at the second maximum reflection wavelength being 15% or more,
the infrared reflective layer including a conductive layer comprising a metal sputtered layer,
the conductive layer in the infrared reflective layer consisting of a metal oxide layer/an oxygen-deficient metal oxide layer/a silver layer/an oxygen-deficient metal oxide layer/a metal oxide layer/an oxygen-deficient metal oxide layer/a silver layer/an oxygen-deficient metal oxide layer/a metal oxide layer layered in this order,
the first resin layer containing a coloring agent,
the second resin layer containing no coloring agent,
the first lamination glass member being situated on a side of an interior space, and
the second lamination glass member being situated on a side of an exterior space.

2. The laminated glass according to claim 1, wherein the coloring agent in the first layer is a perylene compound, a phthalocyanine compound, a naphthalocyanine compound, or an anthracyanine compound.

3. The laminated glass according to claim 1, wherein the first resin layer contains heat shielding particles.

4. The laminated glass according to claim 1, wherein the thermoplastic resin in the first resin layer is a polyvinyl acetal resin.

5. The laminated glass according to claim 1, wherein the first resin layer contains a plasticizer.

6. The laminated glass according to claim 1, wherein the thermoplastic resin in the second resin layer is a polyvinyl acetal resin.

7. The laminated glass according to claim 1, wherein the second resin layer contains a plasticizer.

8. The laminated glass according to claim 1, being a laminated glass that is attached to an opening between the exterior space, and the interior space to which a heat ray is incident from the exterior space, in a building or vehicle.

* * * * *